(12) United States Patent
Paul et al.

(10) Patent No.: US 11,781,017 B2
(45) Date of Patent: Oct. 10, 2023

(54) BLENDS OF POLYARYLETHERKETONES HAVING IMPROVED IMPACT-RESISTANCE, ELONGATION AT BREAK AND FLEXIBILITY

(71) Applicant: ARKEMA FRANCE, Colombes (FR)

(72) Inventors: Clément Paul, Serquigny (FR); Philippe Bussi, Colombes (FR); Benoit Brule, Serquigny (FR)

(73) Assignee: Arkema France, Colombes (FR)

( * ) Notice: Subject to any disclaimer, the term of this patent is extended or adjusted under 35 U.S.C. 154(b) by 437 days.

(21) Appl. No.: 16/967,510

(22) PCT Filed: Feb. 5, 2019

(86) PCT No.: PCT/FR2019/050257
§ 371 (c)(1),
(2) Date: Aug. 5, 2020

(87) PCT Pub. No.: WO2019/150060
PCT Pub. Date: Aug. 8, 2019

(65) Prior Publication Data
US 2021/0222009 A1 Jul. 22, 2021

(30) Foreign Application Priority Data
Feb. 5, 2018 (FR) ...................................... 1850951

(51) Int. Cl.
*C08L 83/04* (2006.01)
*C08L 83/12* (2006.01)
*C08L 71/12* (2006.01)

(52) U.S. Cl.
CPC ............. *C08L 83/12* (2013.01); *C08L 71/123* (2013.01); *C08L 83/04* (2013.01)

(58) Field of Classification Search
CPC ......... C08L 83/10; C08L 83/04; C08L 71/123
See application file for complete search history.

(56) References Cited

U.S. PATENT DOCUMENTS

| 8,013,251 B2 | 9/2011 | Bhandari et al. |
| 2005/0004326 A1* | 1/2005 | Seargeant ............... C08L 71/00 525/534 |
| 2009/0234060 A1* | 9/2009 | Haralur .................. C08L 83/10 525/431 |
| 2009/0292073 A1 | 11/2009 | Richter et al. |
| 2010/0147548 A1 | 6/2010 | Bhandari et al. |
| 2017/0242372 A1 | 8/2017 | Omori et al. |

OTHER PUBLICATIONS

AMCO (https://www.amcopolymers.com/resources/blog/molecular-weight-and-its-effects-on-polymer-properties#:~:text=A%20High%20molecular%20weight%20increases%20the%20impact%20resistance%20of%20the,chemical%20resistance%20%2D%20to%20a%20point) (Jan. 2018).*
International Search Report (PCT/ISA/210) dated May 9, 2019, by the European Patent Office as the International Searching Authority for International Application No. PCT/FR2019/050257.
Written Opinion (PCT/ISA/237) dated May 9, 2019, by the European Patent Office as the International Searching Authority for International Application No. PCT/FR2019/050257.

* cited by examiner

*Primary Examiner* — Kuo Liang Peng
(74) *Attorney, Agent, or Firm* — Boone IP Law

(57) ABSTRACT

A polymer blend, including: (i) a poly(aryl ether ketone); (ii) a polysiloxane; and (iii) a block copolymer containing polysiloxane blocks. A process for manufacturing the polymer blend, the use of the polymer blend for the manufacture of parts, notably in the petroleum, cabling, aeronautical, motor vehicle, electronics, electrotechnical, composite, additive manufacturing and medical device sectors and also a part at least partially manufactured from said blend.

13 Claims, 3 Drawing Sheets

BLENDS OF POLYARYLETHERKETONES HAVING IMPROVED IMPACT-RESISTANCE, ELONGATION AT BREAK AND FLEXIBILITY

TECHNICAL FIELD

The present patent application relates to polymer blends based on poly(aryl ether ketones) with improved impact resistance, elongation at break and flexibility. It also relates to a process for manufacturing such blends, and also to the use thereof for manufacturing parts, notably in the petroleum, cabling, aeronautical, motor vehicle, electronics, electrotechnical, composite, additive manufacturing and medical device sectors.

PRIOR ART

Poly(aryl ether ketones) (PAEKs) are high-performance thermoplastic polymers that are suitable for use in extreme environments on account of their high melting point associated with excellent mechanical properties and exceptional fire resistance and resistance to chemical products. PAEKs can thus compete with metals, with the advantage of being lighter and being able to be converted via the conventional techniques for the implementation of thermoplastic materials.

Despite these advantageous properties, it is occasionally necessary to formulate poly(aryl ether ketones) in order to satisfy specific specifications. Thus, a higher impact resistance may be sought in order to manufacture parts which notably better withstand crack propagation. Moreover, greater flexibility enables novel methods for using and implementing the parts to be accommodated, with greater possibility of bending, enabling, for example, easier assembly in a restricted space such as an engine or a winding on a mandrel of smaller radius.

It is known, for example, from US 2009/0292073 A1 that the addition of polyolefins such as polyoctenylene makes it possible to improve the impact resistance of the poly(aryl ether ketone).

Patent application US 2005/0004326 A1 moreover proposes to improve the impact resistance and the elongation at break of poly(ether ketones) by formulating them with a polysiloxane. In order to improve the compatibility of the polysiloxane, it preferably has a very high molecular weight. However, dispersion of the polysiloxane in these blends is not always satisfactory. Also, these blends may present difficulties in manufacturing, starting from the compounding phase, but also during forming.

Moreover, U.S. Pat. No. 8,013,251 B2 teaches that the addition of a copolymer containing polyimide and polysiloxane blocks enables the ductility of poly(aryl ether ketones) to be increased. However, the examples demonstrate that only certain copolymers allow compounding, and that an amount of at least 50% by weight is needed to improve the ductility. Now, the presence of such an amount of copolymer affects the properties of the poly(aryl ether ketone) matrix, notably its heat resistance and its dimensional stability.

Patent application US 2017/0242372 A1 describes a conveyor belt manufactured from a blend comprising a poly(etherimide) modified with a polysiloxane, a polyetherimide, a poly(ether ether ketone) and a conductive material.

However, the combination of the proposed blends still does not make it possible to satisfy the specifications of certain stringent applications.

SUMMARY OF THE INVENTION

The aim of the invention is thus to propose blends based on poly(aryl ether ketones) whose impact resistance, elongation at break and flexibility are improved relative to the blends of the prior art.

Specifically, the present invention is based on the finding that a blend based on ternary poly(aryl ether ketone), comprising a polysiloxane and a block copolymer containing polysiloxane blocks, has excellent impact-resistance properties and improved flexibility relative to comparable blends including only two from among these components.

In the light of the current results, it is assumed that the advantageous mechanical properties are notably linked to the presence of the block copolymer containing polysiloxane blocks, which ensures better dispersion of the polysiloxane. Specifically, study of the microstructure revealed that the blends according to the invention present a finer dispersion compared with blends of poly(aryl ether ketones) containing only the polysiloxane. It is assumed that the block copolymer containing polysiloxane blocks facilitates the dispersion of polysiloxane in the poly(aryl ether ketone) matrix by acting as a surfactant.

On this basis, it was able to be confirmed that the ternary blends of poly(aryl ether ketones) according to the invention have improved impact resistance, elongation at break and flexibility. Such blends can consequently satisfy a stringent specification, accommodate novel methods for using and implementing the parts and reduce the stress required for a given strain and thus the fatigue to prolong the service life of the parts.

Thus, according to a first aspect, a subject of the invention is a polymer blend, comprising:
 (i) a poly(aryl ether ketone);
 (ii) a polysiloxane; and
 (iii) a block copolymer containing polysiloxane blocks.

According to a preferred embodiment, the poly(aryl ether ketone) in the blend has a viscosity, as measured at 380° C. and 1 Hz, of greater than 100 Pa·s, preferably greater than 200 Pa·s and most particularly greater than 300 Pa·s.

Preferably, the poly(aryl ether ketone) is chosen from the group consisting of poly(ether ketone) (PEK), poly(ether ether ketone) (PEEK), poly(ether ether ketone ketone) (PEEKK), poly(ether ketone ketone) (PEKK), poly(ether ketone ether ketone ketone) (PEKEKK), poly(ether ether ketone ether ketone) (PEEKEK), poly(ether ether ether ketone) (PEEEK) and poly(ether diphenyl ether ketone) (PEDEK), blends thereof and copolymers thereof with each other or with other members of the poly(aryl ether ketone) family.

Advantageously, the polymer blend according to the invention comprises 50% to 98%, preferably 60% to 96%, more preferably 70% to 95%, by weight of poly(aryl ether ketone).

Preferably, the poly(aryl ether ketone) is a poly(ether ketone ketone) (PEKK), a poly(ether ether ketone) (PEEK) or a blend thereof.

The PEKK may in particular have a mass percentage of terephthalic units relative to the sum of the terephthalic and isophthalic units of between 50% and 90%.

The polysiloxane may have a viscosity, as measured at 380° C. and 1 Hz, of greater than 100 Pa·s, preferably greater than 200 Pa·s and most particularly greater than 300 Pa·s.

Preferably, the polymer blend according to the invention comprises 1% to 49%, preferably 2% to 40%, more preferably 2.5% to 25%, by weight of polysiloxane.

Preferably, the block copolymer containing polysiloxane blocks has a viscosity, as measured at 380° C. and 1 Hz, of greater than 100 Pa·s, preferably greater than 200 Pa·s and most particularly greater than 300 Pa·s.

Advantageously, the polymer blend according to the invention comprises 1% to 49%, preferably 2% to 40%, more preferably 2.5% to 30%, by weight of block copolymer containing polysiloxane blocks.

Preferably, the block copolymer containing polysiloxane blocks also includes blocks chosen from poly(etherimides), poly(aryl ether ketones), poly(aryl ether sulfones), poly(phenylene sulfides), poly(arylamideimides), poly(phenylenes), poly(benzimidazoles) or polycarbonates.

According to a second aspect, the invention is directed toward a process for preparing a polymer blend according to the invention, comprising the steps of:
 (a) placing a poly(aryl ether ketone), a polysiloxane and a block copolymer containing polysiloxane blocks in contact under conditions in which the poly(aryl ether ketone) melts; and
 (b) allowing said blend to cool to obtain the blend.

Preferably, step (a) is performed in a twin-screw extruder or a co-kneader.

According to a third aspect, the invention is directed toward the use of a polymer blend according to the invention for the manufacture of parts, notably by molding, notably by injection molding or by compression molding, by fused filament fabrication (FFF) additive manufacturing, extrusion of films or sheets, calendering extrusion, extrusion of tubes or pipes, sheath extrusion, spinning, rotational molding, thermoforming, coating, laser-sintering additive manufacturing, powder coating or for the production of composites.

Finally, according to a fourth aspect, the invention is directed toward a part at least partially manufactured from the polymer blend according to the invention.

BRIEF DESCRIPTION OF THE FIGURES

The invention will be better understood in light of the description which follows and of the figures, which show.

DESCRIPTION OF THE EMBODIMENTS

Definition of the Terms

Figure 1:
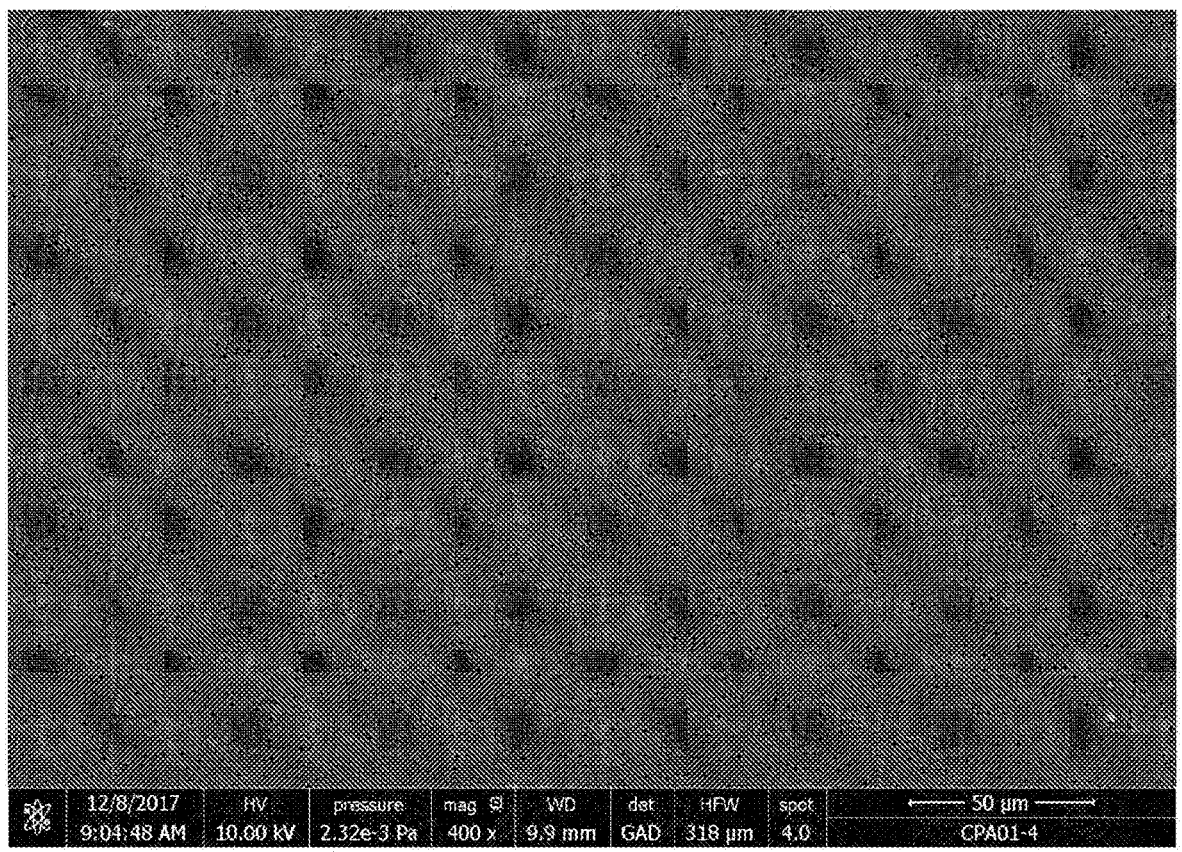
FIG. 1 the blend of example 3 observed by scanning electron microscopy (SEM) at a magnification of ×400.

The term "polymer blend" is understood to denote a macroscopically homogeneous polymer composition. The term also covers such compositions composed of mutually immiscible phases dispersed at the micrometric scale.

The term "copolymer" is understood to denote a polymer derived from the copolymerization of at least two chemically different types of monomer, referred to as comonomers. A copolymer is thus formed from at least two repeating units. It may also be formed from three or more repeating units.

More specifically, the term "block copolymer containing polysiloxane blocks" is understood to denote copolymers in the preceding sense, in which at least two different homopolymer blocks are covalently bonded and one of the blocks is composed of siloxane repeating units. The length of the blocks may be variable. Preferably, the blocks are composed of from 1 to 1000, preferably 1 to 100 and in particular 1 to 50 repeating units, respectively. The link between the two homopolymer blocks may occasionally require an intermediate non-repeating unit known as a junction block.

The term "dispersion" is understood to denote a heterogeneous composition notably including several phases. In the blend according to the invention, the poly(aryl ether ketone) generally forms the continuous phase and the other components one or more dispersed phases.

The term "viscosity" is understood to denote the viscosity as measured at 380° C. and at 1 Hz under an inert atmosphere ($N_2$), using an Anton Paar MCR 302 oscillatory rheometer, in plate/plate geometry.

The term "degree of crystallinity" is understood to denote the degree of crystallinity as calculated from wide-angle X-ray scattering (WAXS) measurements, on a Nano-inXider® machine with the following conditions:
 Wavelength: main $K\alpha 1$ line of copper (1.54 angstroms).
 Generator power: 50 kV-0.6 mA.
 Observation mode: transmission
 Counting time: 10 minutes A spectrum of the scattered intensity as a function of the diffraction angle is thus obtained. This spectrum makes it possible to identify the presence of crystals, when peaks are visible on the spectrum in addition to the amorphous halo. In the spectrum, it is possible to measure the area of the crystalline peaks (designated A) and the area of the amorphous halo (designated AH). The proportion (by mass) of crystalline PAEK in the PAEK is estimated by means of the ratio (A)/(A+AH).

The term "melting point" is understood to denote the temperature at which an at least partially crystalline polymer passes to the viscous liquid state, as measured by differential scanning calorimetry (DSC) according to the standard NF EN ISO 11 357-3 using a heating rate of 20° C./min.

The term "glass transition temperature" is understood to denote the temperature at which an at least partially amorphous polymer passes from a rubbery state to a glassy state, or vice versa, as measured by differential scanning calorimetry (DSC) according to the standard NF EN ISO 11357-2 using a heating rate of 20° C./min.

Poly(Aryl Ether Ketone)

According to the invention, the blend comprises at least one poly(aryl ether ketone) (PAEK).

Poly(aryl ether ketones) (PAEKs) include units having the following formulae:

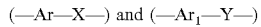

(—Ar—X—) and (—Ar$_1$—Y—)

in which:
 Ar and Ar$_1$ each denote a divalent aromatic radical;
 Ar and Ar$_1$ may be chosen, preferably, from 1,3-phenylene, 1,4-phenylene, 4,4'-biphenylene, 1,4-naphthylene, 1,5-naphthylene and 2,6-naphthylene, which are optionally substituted;
 X denotes an electron-withdrawing group; it may be chosen, preferably, from the carbonyl group and the sulfonyl group;
 Y denotes a group chosen from an oxygen atom, a sulfur atom, an alkylene group, such as —CH$_2$- and isopropylidene.

In these X and Y units, at least 50%, preferably at least 70% and more particularly at least 80% of the groups X are a carbonyl group, and at least 50%, preferably at least 70% and more particularly at least 80% of the groups Y represent an oxygen atom. According to a preferred embodiment, 100% of the groups X denote a carbonyl group and 100% of the groups Y represent an oxygen atom.

More preferentially, the poly(aryl ether ketone) (PAEK) may be chosen from:

a poly(ether ketone ketone), also referred to as PEKK, comprising units of formula I A, of formula I B, and a blend thereof:

Formula I A

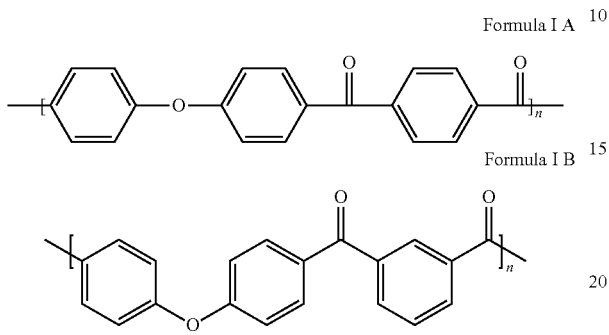

Formula I B a poly(ether ether ketone), also referred to as PEEK, comprising units of formula II:

Formula II

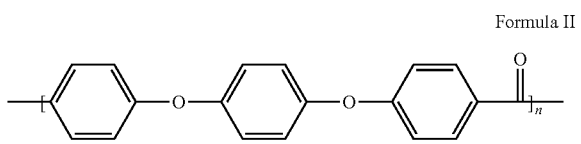

The linkages may be completely para (Formula II). In the same way, it is possible to partially or completely introduce meta linkages into these structures at the ethers and the ketones, according to the two examples of formulae III and IV below:

Formula III

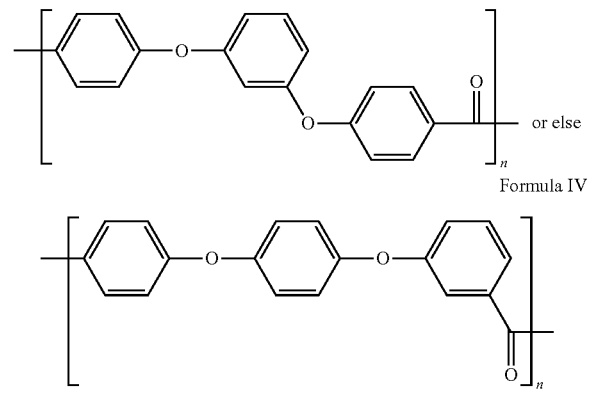

Formula IV or ortho linkages according to formula V:

Formula V

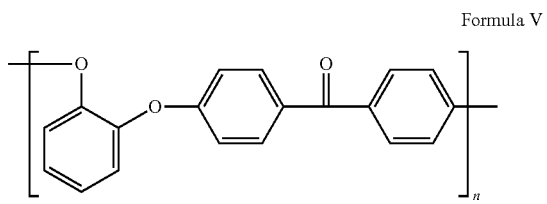

a poly(ether ketone), also referred to as PEK, comprising units of formula VI:

Formula VI

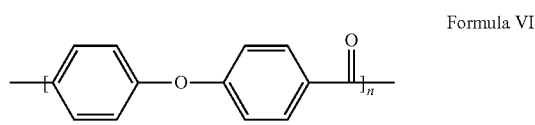

Similarly, the linkage may be completely para but it is possible also to partially or completely introduce meta linkages (formulae VII and VIII):

Formula VII

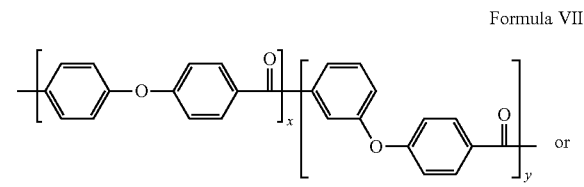 or

Formula VIII

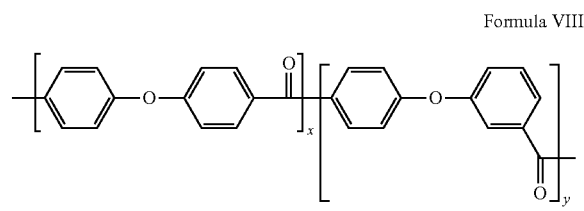

a poly(ether ether ketone ketone), also referred to as PEEKK, comprising units of formula IX:

Formula IX

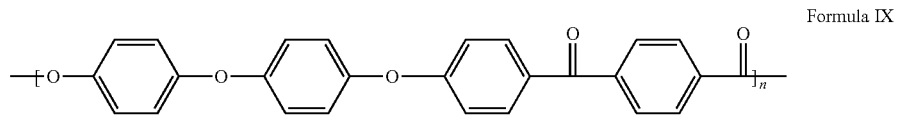

In the same way, it is possible to introduce meta linkages into these structures at the ethers and the ketones.

a poly(ether ether ether ketone), also referred to as PEEEK, comprising units of formula X:

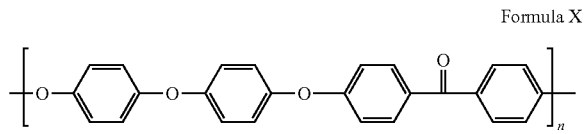

Formula X

In the same way, it is possible to introduce meta linkages into these structures at the ethers and the ketones but also biphenol or diphenyl linkages according to formula XI (units of D type in the next designations; formula XI thus corresponds to the designation PEDEK):

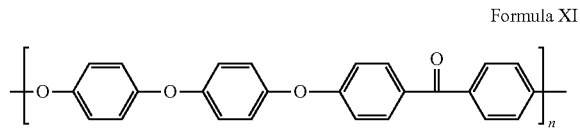

Formula XI

Other arrangements of the carbonyl group and of the oxygen atom are also possible.

In all of the preceding formulae, the index n, when present, may take any values, notably 1 to 100, preferably 1 to 50 and most particularly 1 to 10. Preferably, the index n is equal to 1. In all of the preceding formulae, the indices x and y, when present, may take any values independently of each other, notably 1 to 100, preferably 1 to 50 and most particularly 1 to 10. Preferably, the indices x and y are equal to 1.

Preferably, the PAEKs used in the invention are selected from the group consisting of poly(ether ketone) (PEK), poly(ether ether ketone) (PEEK), poly(ether ether ketone ketone) (PEEKK), poly(ether ketone ketone) (PEKK), poly(ether ketone ether ketone ketone) (PEKEKK), poly(ether ether ketone ether ketone) (PEEKEK), poly(ether ether ether ketone) (PEEEK) and poly(ether diphenyl ether ketone) (PEDEK), blends thereof and copolymers thereof with each other or with other members of the PAEK family. PEEK and PEKK and also blends thereof are particularly preferred.

Advantageously, the change in molecular mass of the PAEK in molten form can be limited by addition of one or more additives, for example phosphates.

Preferably, the poly(aryl ether ketone) (PAEK) in the blend according to the invention comprises at least one poly(ether ketone ketone) (PEKK) which represents more than 50%, preferably more than 60%, notably more than 70%, more preferably more than 80% and in particular more than 90% by mass of this component, limit inclusive. The remaining 10% to 50% by mass may consist of other polymers belonging to the PAEK family.

Advantageously, the PEKK has a mass percentage of terephthalic units, relative to the sum of the terephthalic and isophthalic units, of between 40% and 100% and preferably between 50% and 90% and most particularly between 60% and 80%, limits inclusive.

More preferably, the poly(aryl ether ketone) consists essentially of PEKK or PEEK.

The poly(aryl ether ketone) in the blend according to the invention may be amorphous or semicrystalline. The crystallinity of the poly(aryl ether ketone) depends notably on the structure of the polymer, but may also be a function of its thermal history.

According to a preferred embodiment of the invention, the poly(aryl ether ketone) in the blend according to the invention is amorphous. According to another preferred embodiment, it is semicrystalline. In the latter case, the poly(aryl ether ketone) in the blend according to the invention advantageously has a crystallinity of up to 60%, preferably from 10% to 50%, even more preferably from 15% to 40% and particularly preferably from 20% to 30%.

The blend according to the invention preferably contains a poly(aryl ether ketone) with a viscosity, measured at 380° C. and 1 Hz, of greater than 100 Pa·s, preferably greater than 200 Pa·s and most particularly greater than 300 Pa·s.

The melting point of the poly(aryl ether ketone) is preferably greater than 280° C., and most particularly greater than 300° C. The glass transition temperature of the poly(aryl ether ketone) is preferably between 100 and 250° C., preferably between 120 and 200° C. and most particularly between 140 and 180° C.

Such poly(aryl ether ketones) are commercially available, for example the PEKK under the name Kepstan® from the company Arkema, and the PEEK under the name KetaSpire® from the company Solvay, under the name VestaKeep® from the company Evonik and the PEEK Victrex® from the company Victrex.

The blend according to the invention preferably contains 50% to 98%, preferably 60% to 96%, more preferably 70% to 95%, by weight of poly(aryl ether ketone).

Polysiloxane

The blend according to the invention contains, besides the poly(aryl ether ketone), also a polysiloxane. Such polysiloxanes may be monosubstituted or disubstituted with $C_1$ to $C_{12}$, preferably $C_1$ to $C_6$ and most particularly $C_1$ to $C_4$ alkyl groups, and/or phenyl groups. Preferably, the alkyl groups are methyl groups. The alkyl or phenyl groups of the polysiloxane may be substituted with one or more functional groups such as epoxy, alkoxy, notably methoxy, amine, ketone, thioether, halogen, nitrile, nitro, sulfone, phosphoryl, imino or thioester. These functional groups may also be located at the end of the polysiloxane chain. Such functionalized polysiloxanes may be used with a view to reacting them during the blending (reactive siloxanes).

Nevertheless, preferably, the polysiloxane does not include any functional groups. Moreover, the alkyl or phenyl groups of the polysiloxane may be substituted with one or more carbocyclic, aryl, heteroaryl, alkyl, alkenyl, bicyclic or tricyclic groups.

Preferably, the polysiloxane present in the blend is a poly(dimethylsiloxane) (PDMS).

Preferably, the polysiloxane has a very high molecular weight. Thus, the polysiloxane may advantageously have a number-average molecular weight ranging from 100 000 to 1 000 000 and preferably from 250 000 to 750 000.

Advantageously, it may be a polysiloxane belonging to the silicone paste family. These silicones, sold for example by the company Wacker, have the advantage of having high heat resistance and resistance to chemical products, like poly(aryl ether ketones).

In order to blend correctly with the matrix, the polysiloxane preferably has a viscosity below that of the poly(aryl ether ketone). Preferably, the viscosity of the polysiloxane is at least 30%, preferably 20%, more preferably 15% and most particularly 10% less than the viscosity of the poly(aryl ether ketone).

A polysiloxane with a viscosity, measured at 380° C. and 1 Hz, of greater than 50, advantageously greater than 100 Pa·s, preferably greater than 200 Pa·s and most particularly greater than 300 Pa·s, is particularly preferred.

It is preferred for the polysiloxane to be inert under the conditions for preparing and using the blend of the invention. Thus, it is advantageous for the polysiloxane to withstand the manufacturing of the blend and thus the melting point of the poly(aryl ether ketone) matrix.

A blend comprising 1% to 49%, preferably 2% to 40%, more preferably 2.5% to 25%, by weight of polysiloxane is particularly preferred.

In order to facilitate the handling, the polysiloxane may be combined with a solid support such as a silica, notably fumed silica. The blend is then in the form of granules or of powder. Such polysiloxane formulations include up to 55% by weight, preferably up to 40% by weight, of support. The support may also be another type of filler or else a polymer powder, which may be of the same type as the matrix of the blend. The polysiloxane proportion indications given in the present patent application always refer to the polysiloxane content, the support being deducted.

Such polysiloxanes are commercially available. Thus, the company Wacker sells ultra-high molecular weight polysiloxanes under the name Genioplast® GUM and these same polysiloxanes on a silica support under the name Genioplast® PELLET S.

Block Copolymer Containing Polysiloxane Blocks

The blend according to the invention contains, besides the poly(aryl ether ketone), also a block copolymer containing polysiloxane blocks.

The polysiloxane blocks may be monosubstituted or disubstituted with $C_1$ to $C_{12}$, preferably $C_1$ to $C_6$ and most particularly $C_1$ to $C_4$ alkyl groups, and/or phenyl groups. Preferably, the alkyl groups are methyl groups. Preferably, the polysiloxane units present in the block copolymer containing polysiloxane blocks are poly(dimethylsiloxane) (PDMS) units.

The alkyl or phenyl groups of the polysiloxane block may be substituted with one or more functional groups such as epoxy, alkoxy, notably methoxy, amine, ketone, thioether, halogen, nitrile, nitro, sulfone, phosphoryl, imino or thioester. These functional groups may also be located at the end of the chain of the block copolymer containing polysiloxane blocks. Nevertheless, preferably, the polysiloxane block does not include any functional groups. Moreover, the alkyl or phenyl groups of the polysiloxane block may be substituted with one or more carbocyclic, aryl, heteroaryl, alkyl, alkenyl, bicyclic or tricyclic groups.

The block copolymer containing polysiloxane blocks moreover includes blocks of units other than polysiloxanes. They may notably be polyetherimide, poly(aryl ether ketone), poly(aryl ether sulfone), poly(phenylene sulfide), poly(arylamideimide), poly(phenylene), poly(benzimidazole) and/or polycarbonate blocks. Preferably, the block copolymer containing polysiloxane blocks also includes poly(etherimide) or poly(aryl ketone ketone) blocks.

It is particularly preferred for the block copolymer containing polysiloxane blocks to include blocks of the poly(aryl ether ketone) of which the matrix of the blend according to the invention is composed.

The block copolymer containing polysiloxane blocks preferably includes a siloxane content of from 10% to 70% by weight, advantageously from 15% to 60% by weight, more preferably 20% to 50% by weight, relative to the weight of the copolymer. In contrast with the compositions described in U.S. Pat. No. 8,013,251, the use of a block copolymer containing polysiloxane blocks with a high siloxane content does not lead to delamination during extrusion and molding in the blends according to the invention.

Preferably, the block copolymer containing polysiloxane blocks has a viscosity, measured at 380° C. and 1 Hz, of greater than 100 Pa·s, preferably greater than 200 Pa·s and most particularly greater than 300 Pa·s. According to one embodiment, the block copolymer containing polysiloxane blocks has a viscosity, measured at 380° C. and 1 Hz, of between 300 and 500 Pa·s. According to another embodiment, the block copolymer containing polysiloxane blocks has a viscosity, measured at 380° C. and 1 Hz, of between 600 and 900 Pa·s.

A polymer blend comprising 1% to 49%, preferably 2% to 40%, more preferably 2.5% to 30%, by weight of block copolymer containing polysiloxane blocks is particularly preferred.

Such block copolymers containing polysiloxane blocks are commercially available. Thus, the company Sabic sells copolymers containing PEI-PDMS blocks under the name Siltem®. Moreover, the company Idemitsu Kosan sells a polycarbonate-PDMS copolymer under the name Tarflon® Neo.

Other Components

The blend according to the invention may moreover include other polymers, in smaller amount. Thus, the content of additional polymers, different from those discussed above, in the blend of the invention is preferably less than 20% by weight, more preferably less than 15% by weight and most particularly less than 10% by weight. Among the additional polymers, mention may be made in particular of polyetherimide.

The blend according to the invention may moreover, as discussed above, also include customary additives, such as fillers. Among the fillers that may be envisaged, mention may notably be made of silica and alumina, nucleating fillers such as mineral fillers, notably talc, carbon-based fillers, notably carbon nanotubes, carbon fibers or metal oxides, or reinforcing fillers such as glass fibers or carbon fibers.

Moreover, the blend may optionally include minor amounts of functional additives. Examples of such that may be mentioned include antistatic agents, antioxidants, melt stabilizers, conductive agents, flame retardants, colorants and also reactive agents such as alkaline carbonates.

Advantageously, the polymer blend according to the invention comprises 0% to 30%, preferably 1% to 20%, more preferably 2% to 10%, by weight of additives. Preferably, the blend does not include any additives other than the optional support for the polysiloxane. In particular, it is preferred for the blend according to the invention not to include any conductive additives, for instance carbon black.

Process for Manufacturing the Blend According to the Invention

The polymer blend according to the invention may be obtained via any of the processes known in the prior art. Notably, it may be obtained by placing the components in contact at a temperature above the melting point of the poly(aryl ether ketone). After cooling, it may then be granulated, where appropriate.

An easy means for obtaining the blend according to the invention is to introduce the components in the desired proportions into a co-kneader or an extruder, notably a twin-screw extruder, heated to a temperature exceeding the melting point of the poly(aryl ether ketone). Depending on the chosen blending means, the blend according to the invention is obtained in the form of granules.

According to a preferred embodiment, the blend according to the invention is in the form of a heterophase composition. Specifically, usually, the polysiloxane is sparingly soluble or insoluble in the poly(aryl ether ketone). A dispersed phase in the form of nodules in a continuous phase is then observed by electron microscopy. Preferably, the nodules have a mean diameter of less than 20 μm, advantageously less than 10 μm and most particularly less than 5 μm.

Preferably, the poly(aryl ether ketone) forms the continuous phase (also known as the matrix) of the composition and the polysiloxane forms the dispersed phase. The block copolymer containing polysiloxane blocks is preferably essentially present in the dispersed phase.

Use of the Blends According to the Invention

The blend according to the invention may then be used for the manufacture of parts via one of the conventional forming processes.

Thus, the blend according to the invention may be formed, for example, by molding, notably by injection molding or by compression molding, by extrusion, by calendering extrusion, spinning, rotational molding, thermoforming, coating, fused filament fabrication (FFF) additive manufacturing, by extrusion of films or sheets, by calendering extrusion, extrusion of tubes or pipes, sheath extrusion, spinning, rotational molding, thermoforming, coating, laser-sintering additive manufacturing, or by powder coating. The use of the blend according to the invention for producing composites is also particularly advantageous.

For the last three forming processes, it is preferred to start with a powder derived from said composition obtained via standard milling processes. A powder with a volume-median diameter (dv50), as measured according to the standard ISO 9276—parts 1 to 6, of from 10 to 400 μm is particularly preferred. In the present description, a Malvern Mastersizer 2000 particle size analyzer is used and the measurement is performed via the liquid route by laser diffraction on the powder.

Depending on the envisaged use, it may be advantageous to add to the powder of the blend of the invention one or more fillers such as carbon fibers or glass fibers and/or other pulverulent additives and/or flow agents.

The above-mentioned transformation processes make it possible to obtain, from the polymer blend according to the invention, powders, films or sheets, fibers, coatings, parts of varied dimensions and geometries, and composite parts.

The blend according to the invention is particularly advantageous for the manufacture of parts with improved impact resistance, elongation at break and flexibility. The possibility of manufacturing parts that are durable because they exhibit lower crack propagation arises therefrom.

The increase in flexibility and in elongation at break allow higher strains and consequently access to novel designs, notably for mounting or winding. Thus, the blend according to the invention is particularly advantageous for manufacturing parts in the petroleum, cabling, aeronautical, motor vehicle, electronics, electrotechnical, composite, additive manufacturing and medical device sectors.

In the petroleum sector, mention may be made notably of pipes working onshore or offshore, notably liners or tubes for composites, pressure liners and umbilical cables, downhole systems such as drilling shafts and stock shapes. In cabling, mention may be made in particular of cable sheaths for insulation. In the aeronautical sector, mention may notably be made of pipes, composite parts, connectors and supports. In the motor vehicle sector, mention may be made of any engine or transmission environment parts exposed to high temperatures, for instance the turbo inlet and outlet systems or the pipes conveying hot or corrosive liquids (oil circuit, cooling circuit and fuel circuit). Finally, in medical and analytical devices, mention may be made of hoses which withstand high temperatures and pressures.

Moreover, the improved flexibility of the blend makes it possible to envisage novel designs for parts exposed to a high temperature and with high chemical resistance.

The invention will be explained in greater detail in the examples that follow.

EXAMPLES

A. Preparation of PEKK Blends

In a twin-screw extruder (Haake 2, diameter: 16 mm, screw speed: 340-360 rpm, flow rate: 3 kg/h), a poly(ether ketone ketone) (PEKK) (Kepstan®, sold by the company Arkema France) was compounded with a poly(etherimide)-poly(dimethylsiloxane) (PEI-PDMS) copolymer (sold by the company Sabic under the name Siltem® STM 1500 and Siltem® STM 1700) and a very high molecular weight polydimethylsiloxane (PDMS) (Genioplast® Gum, sold by the company Wacker) or a very high molecular weight polydimethylsiloxane (PDMS) on a silica support (Genioplast® PELLET S, sold by the company Wacker, composition: 70% by weight of PDMS, 30% by weight of silica). For comparative purposes, blends were prepared including, besides the poly(ether ketone ketone), only the PEI-PDMS copolymer or only PDMS. The respective composition of the blends is indicated in table 1 below.

The temperature profile in the extruder is adapted to the melting point of the poly(ether ketone ketone), of Kepstan® 6000 type having a ratio of terephthalic units to isophthalic units of 60:40 and of Kepstan® 8000 type having a ratio of terephthalic units to isophthalic units of 80:20 as follows:
poly(ether ketone ketone) of Kepstan® 6000 type: 200° C. at the inlet and then 330° C.,
poly(ether ketone ketone) of Kepstan® 8000 type: 220° C. at the inlet and then 380° C.

The compound obtained is granulated and then dried at 120° C. under vacuum for 24 h.

TABLE 1

Compositions of the polymer blends prepared

| | PEKK (Kepstan ® 6001) | | PEKK (Kepstan ® 8001) | | | | |
|---|---|---|---|---|---|---|---|
| Example | viscosity 800 Pa · s* [% by weight] | viscosity 1080 Pa · s* [% by weight] | viscosity 800 Pa · s* [% by weight] | viscosity 1650 Pa · s* [% by weight] | PEI-PDMS copolymer [% by weight] | PDMS [% by weight] | PDMS on silica support [% by weight] |
| 1 | 85.5 | — | — | — | 7.5+ | 7 | — |
| 2 | — | 85.5 | — | — | 7.5+ | 7 | — |

TABLE 1-continued

Compositions of the polymer blends prepared

| | PEKK (Kepstan ® 6001) | | PEKK (Kepstan ® 8001) | | | | |
| --- | --- | --- | --- | --- | --- | --- | --- |
| Example | viscosity 800 Pa · s* [% by weight] | viscosity 1080 Pa · s* [% by weight] | viscosity 800 Pa · s* [% by weight] | viscosity 1650 Pa · s* [% by weight] | PEI-PDMS copolymer [% by weight] | PDMS [% by weight] | PDMS on silica support [% by weight] |
| 3 | — | — | 85.5 | — | 7.5+ | 7 | — |
| 4 | — | — | — | 85.5 | 7.5+ | 7 | — |
| 5 | — | — | 92.75 | — | 3.75+ | 3.5 | — |
| 6 | — | — | 82.5 | — | 7.5+ | — | 10 |
| 7 | — | — | 85.5 | — | 7.5° | 7 | — |
| 8 | — | — | 82.5 | — | 7.5° | — | 10 |
| REF1 | 100 | — | — | — | — | — | — |
| REF2 | — | — | 100 | — | — | — | — |
| Comp 1 | 90 | — | — | — | — | 10 | — |
| Comp 2 | — | — | 90 | — | — | 10 | — |
| Comp 3 | — | — | 90 | — | 10+ | — | — |
| Comp 4 | — | — | 80 | — | 20+ | — | — |

*at 380° C. and at 1 Hz
+Siltem ® STM 1500
°Siltem ® STM 1500

B. Evaluation of the Impact Resistance and the Tensile Strength

The mechanical properties and the impact resistance of the blends according to the invention were evaluated using 1A tensile testing dumbbells according to the standard ISO 527-2 and 80×10×4 mm³ impact bars according to the Charpy Impact standard ISO 179. The test specimens were prepared by injection on a Battenfeld press using the following parameters, depending on the type of PEKK used:
poly(ether ketone ketone) of Kepstan® 6000 type: feed 330° C.; nozzle: 345° C.; mold 80° C.
poly(ether ketone ketone) of Kepstan® 8000 type: feed 355° C.; nozzle: 380° C.; mold 230° C.

The type A notched impact resistance was evaluated on an impact test machine (Zwick 5102) according to the standard ISO 179. The test specimens were first notched (with a V with a notch bottom radius of 0.25±0.5 mm) on a device specially designed for this purpose (Automatic Notchvis Plus, sold by the company Ceast) and then left to stand for 24 h (at 23° C. and 50% relative humidity) in order to relax the stresses. Each test was performed on at least three test specimens. The type of break of the test specimen is evaluated according to the following definition:
C: Total break. The test specimen separates into two or more parts.
H: Hinge break. The test specimen breaks incompletely, the two parts of the test specimen being attached only by a thin peripheral layer forming a hinge with no residual rigidity.
P: Partial break. The test specimen breaks partially without meeting the definition of the hinge break above.

The tensile strength of the test specimens was measured on a tensile testing machine (Zwick 1445) under the following conditions: temperature 23° C., 50% relative humidity. The Young's modulus was calculated with a mechanical extensometer between 0.05% and 0.25% of strain at 1 mm/min, the rest of the tensile test, up to the breaking point, was performed at 50 mm/min. The number of test specimens which broke before or after strain at the plasticity threshold is noted. A test specimen which broke before this threshold is classified as being brittle and a test specimen which broke after this threshold is classified as being ductile. For example, the classification "1D/2B" corresponds to one test specimen which broke after the threshold, and thus classified as ductile, and two test specimens which broke before the threshold, and thus classified as brittle.

The results of the evaluations are collated in table 2 below.

TABLE 2

Tensile strength and impact resistance of the blends

| | Impact resistance (notched type A) | | Tensile strength (1A) | | |
| --- | --- | --- | --- | --- | --- |
| Example | Resilience [kJ/m²] | Type of break* | Tensile strain $\varepsilon_T$ [%] | Young's modulus E (MPa) | Type of break** |
| 1 | 27.4 | P | 10.8 | ND | 3D |
| 2 | 34.0 | P | 11.4 | ND | 3D |
| 3 | 20.2 | C | 14.1 | 2954 | 3D |
| 4 | 17.8 | C | 6.0 | ND | 1B/2D |
| 5 | 13.5 | C | 16.4 | 3523 | 3D |
| 6 | 13.4 | C | 9.6 | 3121 | 3D |
| 7 | 11.0 | C | ND | ND | ND |
| 8 | 13.2 | C | ND | ND | ND |
| REF1 | 5.1 | C | 19.0 | ND | 4D |
| REF2 | 5.2 | C | 4.7 | 4045 | 3B |
| Comp 1 | 21.6 | H | 4.6 | ND | 2B/2D |
| Comp 2 | 7.8 | C | 4.6 | ND | 2B/1D |
| Comp 3 | 9.1 | C | ND | ND | ND |
| Comp 4 | 6.4 | C | ND | ND | ND |

*C = complete; H = hinge; P = partial
**D = ductile; B = brittle (before strain at the tensile threshold)

It is observed that the impact resistance of the blends according to the invention is markedly higher than that of the reference resins. In addition, it is noted that, for a given PEKK, the impact resistance of the blends according to the invention is higher than that of the comparative blends not containing a block copolymer containing polysiloxane blocks (Comp 1 and 2) or not containing polysiloxane (Comp 3 and 4), even when the content of modifiers is lower. It is noted that the blends according to examples 1 and 3 contain 10% by mass of PDMS (sum of the mass contents of PDMS and of PDMS units of the PEI-PDMS copolymer), i.e. the same overall amount of PDMS as examples Comp 1 and Comp 2.

A change in the mode of breaking is notably observed for examples 1 and 2 (comprising an amorphous PEKK). In addition, it is noted that, for a given PEKK, the impact resistance of the blends according to the invention is higher than that of the comparative blends not containing a block copolymer containing polysiloxane blocks (Comp 1 and 2) or not containing polysiloxane (Comp 3 and 4), even when the content of modifiers is lower. These tests thus demonstrate that the resilience of the ternary blends according to the invention is higher than that of the binary blends.

As regards the tensile strength, it is observed that only the blend according to the invention based on amorphous PEKK (example 1) has a lower strain than the reference resin (REF1), although nevertheless better than the binary blend (Comp 1). The blends according to the invention based on semicrystalline PEKK (examples 3, 5 and 6) have markedly better values than that of the reference resin (REF 2) and the binary blend (Comp 2). These tests thus demonstrate that the tensile strength of the ternary blends according to the invention is higher than that of the binary blends studied.

An evaluation was also made of a blend with a polysiloxane combined with fumed silica (example 6), which is easier to use since it is in the form of granules. This blend has a higher impact resistance and a higher elongation at break than the matrix alone or the binary blend. Nevertheless, it does not reach the level of the equivalent blend without silica (example 3). The test results make it possible to conclude that the tensile strain of the blends according to the invention is higher than that of the binary blends studied.

An evaluation was also made of a blend with a block copolymer containing polysiloxane blocks with a lower content of polysiloxane (Syltem® STM 1700). This copolymer also affords a gain in terms of impact resistance, relative to the pure matrix (REF 2) and relative to the binary blend (Comp 2, 3 and 4).

The comparison of the properties of the blends differing only by the viscosity of the PEKK matrix (examples 1/2 and 3/4) moreover reveals a substantial impact of the viscosity of the matrix.

C. Study of the Morphology of the Blends

Figure 2:
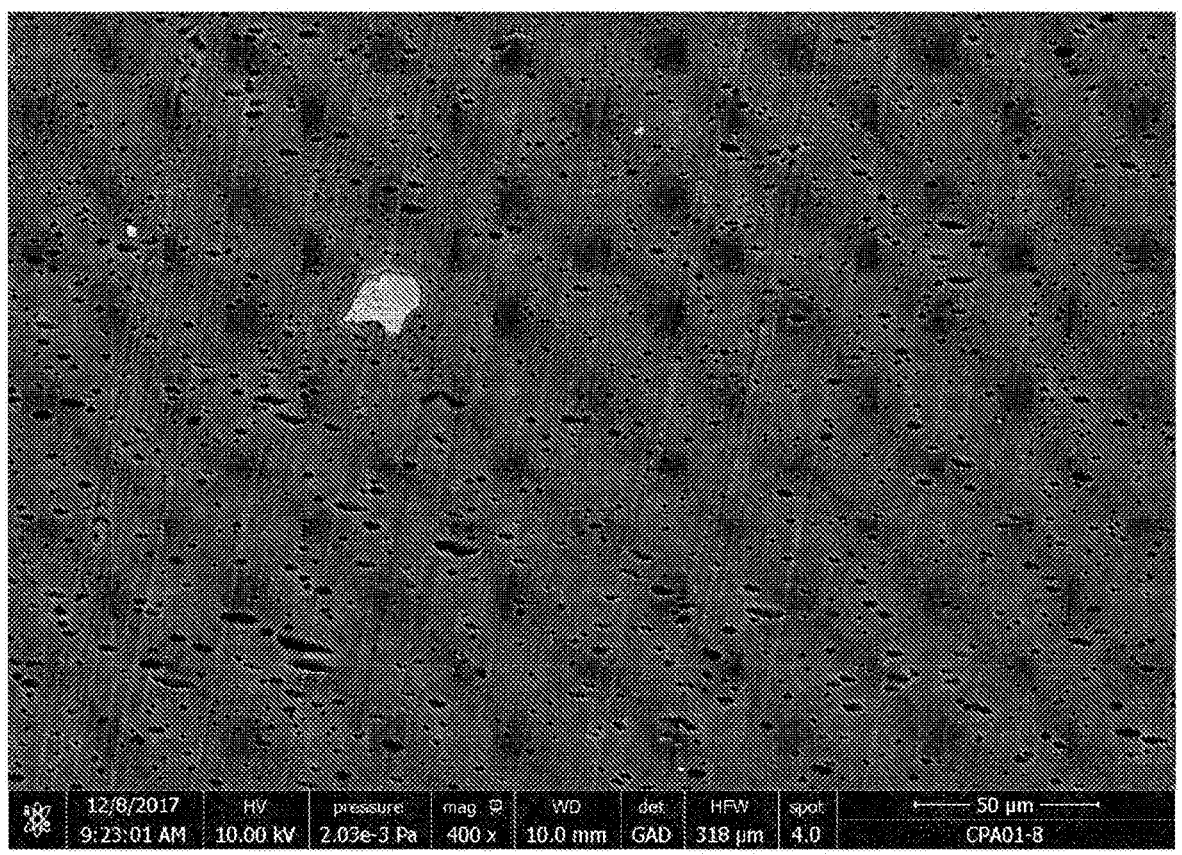
FIG. 2 the blend of example 4 observed by scanning electron microscopy (SEM) at a magnification of ×400.
Figure 3:
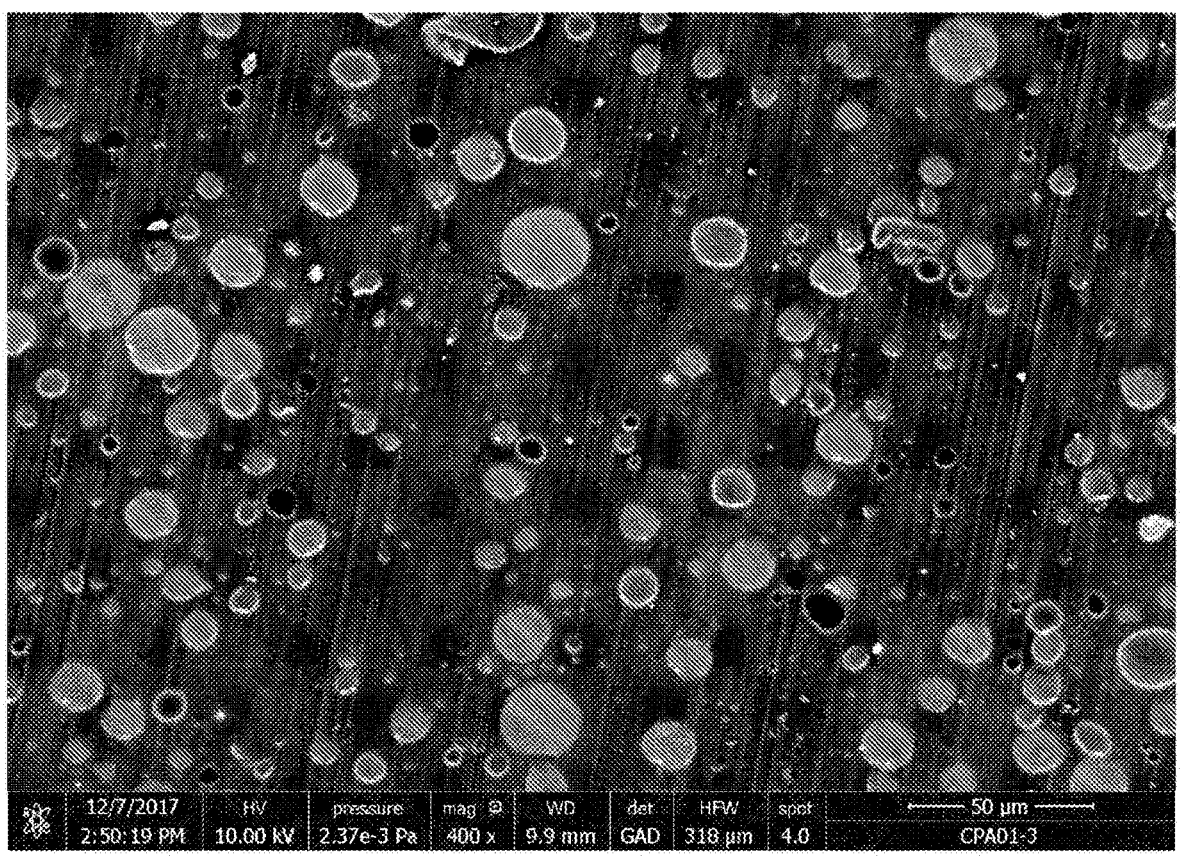
FIG. 3 the blend of Comp. example 2 observed by scanning electron microscopy (SEM) at a magnification of ×400.

In order to study the morphology of the blends prepared, they were observed by scanning electron microscopy (SEM; QUANTA FEG250 model from FEI) in BSE mode, on facies planed by microtomy (diamond knife/room temperature) with a magnification of ×400. The results are illustrated in FIGS. 1 to 3.

It is found that all the blends evaluated are heterophase blends. For the blend of example 3 (see FIG. 1), the dispersion is very fine, with a dimension of the dispersed phase of the order of 0.1 to 1.2 µm. For the blend of example 4 (see FIG. 2), which differs from example 3 only by a poly(ether ketone ketone) of higher viscosity, it is observed that the dispersed phase is of larger size. The binary blend according to comparative example 2 (see FIG. 3), not containing any block copolymer containing polysiloxane blocks, has a dispersed phase with a markedly larger dimension of the dispersed phase, of the order of 1 to 40 µm.

It is thus found that the presence of the block copolymer containing polysiloxane blocks favorably affects the microstructure of the blend. It is assumed that this result is notably linked to better dispersion of the polysiloxane. Without wishing to be bound by this hypothesis, it is assumed that the block copolymer containing polysiloxane blocks allows the formation of nodules of smaller size by acting as a surfactant.

D. Evaluation of the Fire Resistance

In order to check whether the blends conserve the advantageous properties of the poly(aryl ether ketone) matrix, fire resistance tests were performed as follows.

The working sections (4×10 mm$^2$) of ISO 527 1A tensile test specimens prepared as indicated above were subjected to tests of limited oxygen index (LOI) type on a type I test specimen in accordance with ISO 4589 under the conditions below. The test specimens were placed in an atmosphere composed of a mixture of oxygen and nitrogen, the oxygen concentration of this mixture being increased in 1% stages until at least one of the two conditions below is met:
- the combustion time Tc exceeds 3 minutes,
- the combustion proceeds up to 50 mm below the top of the test specimen.

The tests were performed on two test specimens, respectively. The results are collated in table 3 below.

TABLE 3

Results of the fire resistance tests

| Example | Tc at 39% O$_2$ [s] | | Tc at 40% O$_2$ [s] | | Tc at 41% O$_2$ [s] | |
|---|---|---|---|---|---|---|
| REF 2 | 64 | | 77 | >3 min | ND | ND |
| 3 | ND | | 18 | 33 | 27 | >3 min |

It is observed that the fire resistance properties of the poly(aryl ether ketone) matrix are conserved in the blend according to the invention, and even slightly improved.

The results as a whole demonstrate that the poly(aryl ether ketone) blends according to the invention allow an improvement in the resilience and the tensile strain when compared with the poly(aryl ether ketone) alone and with the binary blends, comprising either the block copolymer containing polysiloxane blocks, or a polysiloxane. Study of the morphology of these blends reveals a favorable effect of the block copolymer containing polysiloxane blocks on the dispersion of the polysiloxane in the poly(aryl ether ketone). Finally, it was confirmed that the fire resistance properties of the poly(aryl ether ketone) are conserved in the blends according to the invention.

LIST OF THE DOCUMENTS CITED

US 2009/0292073 A1
US 2005/0004326 A1
U.S. Pat. No. 8,013,251 B2
US 2017/0242372 A1

The invention claimed is:

1. A polymer blend, comprising:
   (i) a poly(aryl ether ketone);
   (ii) a polysiloxane; and
   (iii) a block copolymer containing polysiloxane blocks,
   wherein the poly(aryl ether ketone) has a viscosity, as measured at 380° C. and 1 Hz, of greater than 100 Pa·s; and the block copolymer containing polysiloxane blocks has a viscosity, as measured at 380° C. and 1 Hz, of greater than 100 Pa·s.

2. The polymer blend as claimed in claim 1, in which the poly(aryl ether ketone) is chosen from the group consisting of poly(ether ketone) (PEK), poly(ether ether ketone) (PEEK), poly(ether ether ketone ketone) (PEEKK), poly (ether ketone ketone) (PEKK), poly(ether ketone ether ketone ketone) (PEKEKK), poly(ether ether ketone ether ketone) (PEEKEK), poly(ether ether ether ketone) (PEEEK) and poly(ether diphenyl ether ketone) (PEDEK), blends thereof and copolymers thereof with each other or with other members of the poly(aryl ether ketone) family.

3. The polymer blend as claimed in claim 1, comprising 50% to 98%, by weight of poly(aryl ether ketone).

4. The polymer blend as claimed in claim 1, in which the poly(aryl ether ketone) is a poly(ether ketone ketone) (PEKK), a poly(ether ether ketone) (PEEK) or a blend thereof.

5. The polymer blend as claimed in claim 4, in which the poly(aryl ether ketone) is the PEKK or a blend comprising the PEKK, the PEKK having a mass percentage of terephthalic units relative to the sum of the terephthalic and isophthalic units of between 50% and 90%.

6. The polymer blend as claimed in claim 1, in which the polysiloxane has a viscosity, as measured at 380° C. and 1 Hz, of greater than 100 Pa·s.

7. The polymer blend as claimed in claim 1, comprising 1% to 49%, by weight of polysiloxane.

8. The polymer blend as claimed claim 1, comprising 1% to 49%, by weight of block copolymer containing polysiloxane blocks.

9. The polymer blend as claimed in claim 1, in which the block copolymer containing polysiloxane blocks also includes blocks chosen from poly(etherimides), poly(aryl ether ketones), poly(aryl ether sulfones), poly(phenylene sulfides), poly(arylamideimides), poly(phenylenes), poly(benzimidazoles) or polycarbonates.

10. A process for preparing a polymer blend as claimed in claim 1, comprising the steps of:
    a. placing the poly(aryl ether ketone), the polysiloxane and the block copolymer containing polysiloxane blocks in contact under conditions in which the poly(aryl ether ketone) melts; and
    b. allowing said blend to cool to obtain the blend.

11. The process as claimed in claim 10, in which step (a) is performed in a twin-screw extruder or a co-kneader.

12. A method of manufacturing a part from a polymer blend as claimed in claim 1, comprising manufacturing the part by molding, by fused filament fabrication (FFF) additive manufacturing, extrusion of films or sheets, calendering extrusion, extrusion of tubes or pipes, sheath extrusion, spinning, rotational molding, thermoforming, coating, laser-sintering additive manufacturing, or powder coating.

13. A part at least partially manufactured from the polymer blend as claimed in claim 1.

* * * * *